(12) United States Patent
Kishimoto

(10) Patent No.: US 8,539,243 B2
(45) Date of Patent: Sep. 17, 2013

(54) INFORMATION PROCESSING APPARATUS CAPABLE OF COMMUNICATING WITH EXTERNAL AUTHENTICATION DEVICE

(75) Inventor: Hiroaki Kishimoto, Warabi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1497 days.

(21) Appl. No.: 11/760,387

(22) Filed: Jun. 8, 2007

(65) Prior Publication Data

US 2008/0022090 A1 Jan. 24, 2008

(30) Foreign Application Priority Data

Jun. 20, 2006 (JP) .................................. 2006-170247

(51) Int. Cl.
H04L 29/06 (2006.01)
(52) U.S. Cl.
USPC .................................... 713/182; 726/2; 726/3
(58) Field of Classification Search
USPC ..................................... 726/2, 16, 3; 713/182
See application file for complete search history.

(56) References Cited

U.S. PATENT DOCUMENTS

| 2002/0122203 | A1 | 9/2002 | Matsuda | |
| 2005/0262550 | A1* | 11/2005 | Torii | 726/2 |
| 2006/0005044 | A1* | 1/2006 | Uchikawa | 713/189 |
| 2006/0107039 | A1* | 5/2006 | Sugiura et al. | 713/156 |
| 2007/0050618 | A1* | 3/2007 | Roux et al. | 713/155 |

FOREIGN PATENT DOCUMENTS

| EP | 1494428 A1 | 1/2005 |
| JP | 2002-359718 A | 12/2002 |
| KR | 2006-0048552 A | 5/2006 |

* cited by examiner

*Primary Examiner* — Edward Zee
(74) *Attorney, Agent, or Firm* — Canon USA Inc. IP Division

(57) ABSTRACT

Authentication information necessary for authentication processing at an external authentication device is restricted to be transmitted from a user terminal to an information processing apparatus without being encrypted. The information processing apparatus restricts transmission of information that allows a user to select authentication processing at an external authentication device in the case of not employing encryption communication arranged to communicate encrypted information.

19 Claims, 8 Drawing Sheets

INFORMATION PROCESSING APPARATUS CAPABLE OF COMMUNICATING WITH EXTERNAL AUTHENTICATION DEVICE

BACKGROUND OF THE INVENTION

1. Field of the Invention

The present invention relates to an information processing apparatus capable of communicating with an external authentication device.

2. Description of the Related Art

An information processing apparatus including an authentication function performs authentication processing in the event of a user operating the information processing apparatus via a network. For example, upon a user instructing a printing apparatus to make the transition to a user mode using a Web browser, the printing apparatus requests input of a user identification number from the Web browser, and performs authentication processing based on the user identification number inputted by the user (e.g., Japanese Patent Laid-Open No. 2002-359718).

In the event of the authentication based on the user identification number succeeding, the printing apparatus transmits a Web page in the user mode to the Web browser. Thus, the user can operate the printing apparatus from the Web page in the user mode.

With a network environment, authentication information to be employed for authentication processing is not managed by each of multiple information processing apparatuses but integrally managed by an external authentication device (hereafter, referred to as an authentication server) in some cases.

For example, authentication information such as a user name, a password, and so forth is retained at an authentication server, and an information processing apparatus requests the authentication server to execute authentication processing based on authentication information inputted by a user. In the event of a user operating the information processing apparatus from a user terminal via a network, the information processing apparatus receives authentication information from the user terminal via the network, and requests the authentication server to execute authentication processing based on the received authentication information.

At this time, the information processing apparatus needs to receive the authentication information itself, that has been inputted by the user at the user terminal. In the event of the information processing apparatus retaining authentication information to perform authentication processing, according to some authentication methods, there is no need to transmit the authentication information itself that has been inputted by the user to the information processing apparatus via the network. On the other hand, in the event of the information processing apparatus acting in lieu of the user terminal or mediating between the user terminal and the authentication server regarding a request of the authenticating processing to the authentication server, the information processing apparatus needs to receive the authentication information itself that has been inputted by the user.

However, in the event that the authentication information necessary for the authentication processing at the authentication server is transmitted from the user terminal to the information processing apparatus via the network as it is, the authentication information is readily subjected to wiretapping by a third party, and the authentication information is readily leaked.

Encryption communication is performed between the user terminal and the information processing apparatus, whereby authentication information can be protected from wiretapping. However, the information processing apparatus cannot always perform encryption processing. For example, in the event that employment of encryption communication is not set by the user, the information processing apparatus cannot perform encryption communication.

Enabling selection of the authentication processing at the authentication server in a state in which the information processing apparatus cannot perform encryption communication unintentionally allows the user terminal to transmit authentication information to the information processing apparatus without security measures implemented.

SUMMARY OF THE INVENTION

To this end, the present invention prevents authentication information necessary for authentication processing at an external authentication device from being transmitted from a user terminal to an information processing apparatus without being encrypted.

According to one aspect of the present invention, an information processing apparatus comprises: a transmission unit configured to transmit information which allows a user to select authentication processing at an external authentication device to a user terminal, in the case of employing encryption communication arranged to communicate encrypted information; a reception unit configured to receive authentication information necessary for authentication processing at an external authentication device which was input by the user from the user terminal using the encryption communication; wherein the transmission unit restricts transmission to the user terminal of information which allows a user to select authentication processing at an external authentication device, in the case of not employing the encryption communication.

Also, according to another aspect of the present invention, an information processing method comprises: a transmission step arranged to transmit information which allows a user to select authentication processing at an external authentication device to a user terminal, in the case of employing encryption communication arranged to communicate encrypted information; a reception step arranged to receive authentication information necessary for authentication processing at an external authentication device which was inputted by the user from the user terminal using the encryption communication; wherein transmission to the user terminal of information which allows a user to select authentication processing at an external authentication device is restricted, in the case of not employing the encryption communication.

Also, according to another aspect of the present invention, a computer program, which a computer can read and also execute, causes the computer to execute: a transmission step arranged to transmit information which allows a user to select authentication processing at an external authentication device to a user terminal, in the case of employing encryption communication arranged to communicate encrypted information; and a reception step arranged to receive authentication information necessary for authentication processing at an external authentication device which was inputted by the user from the user terminal using the encryption communication; wherein transmission to the user terminal of information which allows a user to select authentication processing at an external authentication device is restricted, in the case of not employing the encryption communication.

Also, according to another aspect of the present invention, a recording medium storing a computer program, which a computer can read and also execute, causing the computer to execute: a transmission step arranged to transmit information which allows a user to select authentication processing at an external authentication device to a user terminal, in the case of employing encryption communication arranged to communicate encrypted information; a reception step arranged to receive authentication information necessary for authentication processing at an external authentication device which was inputted by the user from the user terminal using the encryption communication; wherein transmission to the user terminal of information which allows a user to select authentication processing at an external authentication device is restricted, in the case of not employing the encryption communication.

Note that this summary does not include all the aspects of the present invention, and that others laid forth in the Claims, and combinations of features thereof, can also be encompassed in the present invention.

Other features and advantages of the present invention will be apparent from the following description taken in conjunction with the accompanying drawings, in which like reference characters designate the same or similar parts throughout the figures thereof.

DESCRIPTION OF THE EMBODIMENTS

Embodiments of the present invention will now be described in detail with reference to the accompanying drawings. It should be noted that the embodiments below do not limit the present invention set forth in the claims and that not all of the combinations of features described in the embodiments are necessarily essential as means for attaining the objects of the invention.

First Embodiment

Description will be made below regarding an embodiment of the present invention with reference to the drawings.

Figure 1:
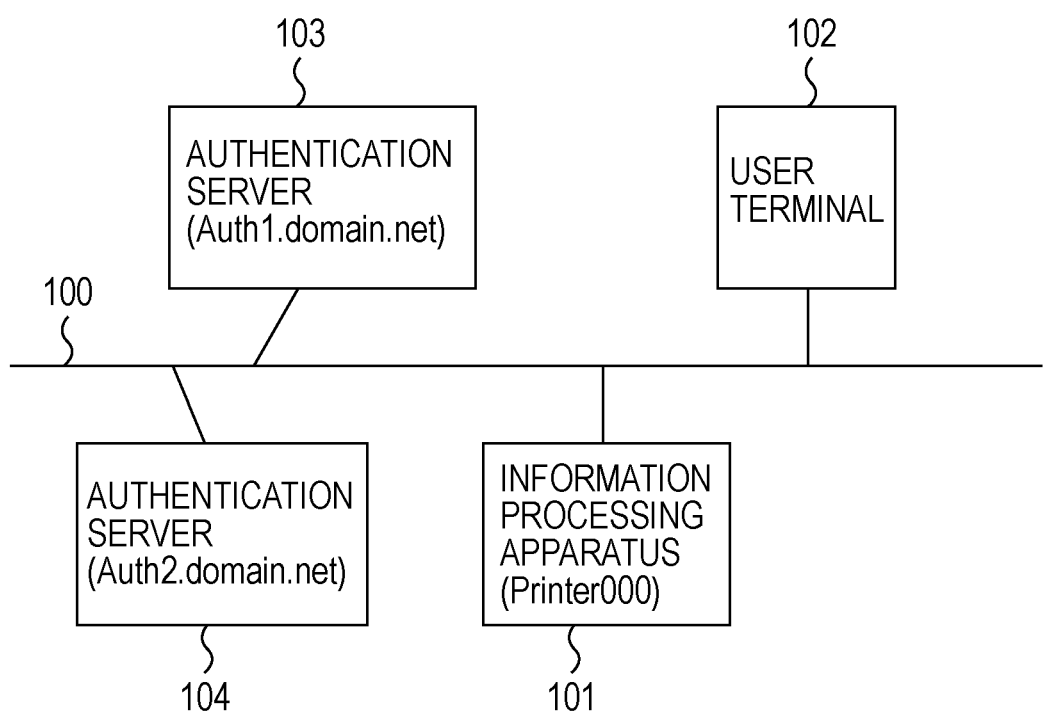
FIG. 1 is a diagram illustrating the configuration of a network system.

FIG. 1 is a diagram illustrating the configuration of a network system. With this network system, an information processing apparatus 101, a user terminal 102, an authentication server 103, and an authentication server 104 are capable of communication mutually via a network 100. This network may be wired or wireless.

The authentication server 103 and the authentication server 104 are authentication devices configured to perform authentication processing based on a user name and a password. The information processing apparatus 101 can perform the authentication processing based on a user name and a password by itself, and also can request the authentication server 103 and the authentication server 104 to execute the authentication processing. Note that the information necessary for the authentication processing is not restricted to a user name and a password.

A name is provided to each of the information processing apparatus 101, authentication server 103, and authentication server 104 as identification information. The name of the information processing apparatus 101 is "Printer000", the name of the authentication server 103 is "Auth1.domain.net", and the name of the authentication server 104 is "Auth2.domain.net".

Figure 2:
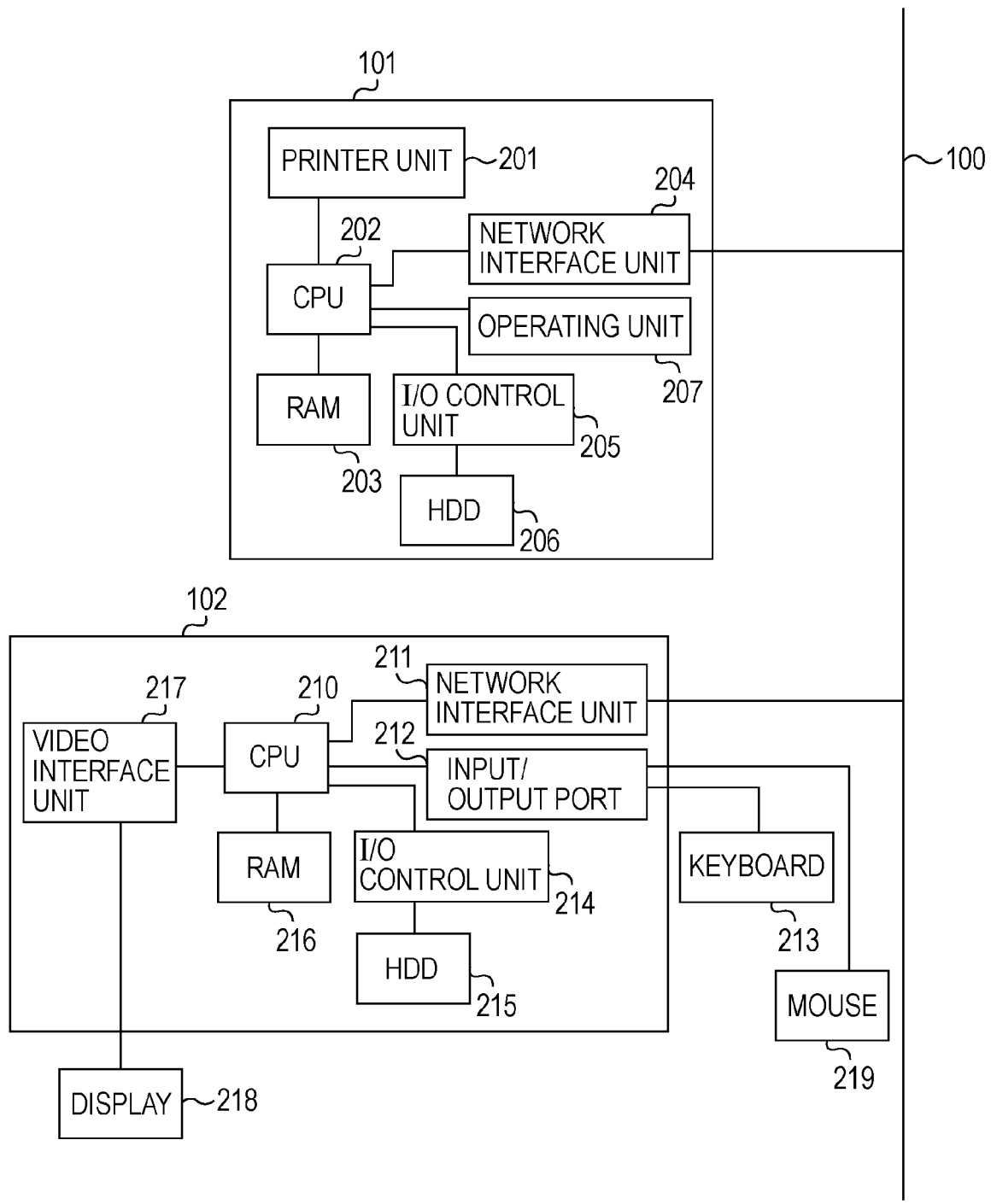
FIG. 2 is a diagram illustrating the hardware configuration of an information processing apparatus 101 and a user terminal 102.

FIG. 2 is a diagram illustrating the hardware configuration of the information processing apparatus 101 and the user terminal 102. Now, a printing apparatus will be described as one example of the information processing apparatus 101. Additionally, the information processing apparatus 101 may be a scanner, digital multi-function apparatus, copier, or the like. The information processing apparatus 101 includes a printer unit 201, a central processing unit (hereafter, referred to as CPU) 202, RAM 203, a network interface unit 204, an I/O control unit 205, an HDD 206, and an operating unit 207.

The CPU 202 reads out a program stored in the HDD 206, and stores the program thereof in the RAM 203. Subsequently, the CPU 202 executes the program stored in the RAM 203 to control the operation of the whole information processing apparatus 101. The printer unit 201 subjects a sheet to printing based on printing data. The RAM 203 stores a program executed by the CPU 202, stores various types of variable values necessary for execution of the program, and/or stores the printing data. The network interface unit 204 performs transmission/reception of information via the network 100. The I/O control unit 205 controls readout of information from the HDD 206, and writing of information to the HDD 206. The HDD 206 is a large-capacity storage device, and stores a program, printing data, and various types of information. The operating unit 207 includes an operating panel, and operating keys. A user browses various types of information displayed on the operating panel, and inputs various types of information using the operating keys.

A personal computer will be described as one example of the user terminal 102. The user terminal 102 may be a workstation, portable terminal, or the like. The user terminal 102 includes a central processing unit (hereafter, referred to as CPU) 210, a network interface unit 211, an input/output port 212, an I/O control unit 214, an HDD 215, RAM 216, and a video interface unit 217. Also, the user terminal 102 is connected to a keyboard 213 and a mouse 219 via the input/output port, and is connected to a display 218 via the video interface unit 217.

The CPU 210 reads out the program stored in the HDD 215, and stores the program thereof in the RAM 216. Subsequently, the CPU 210 executes the program stored in the RAM 216 to control the operation of the whole user terminal 102. The network interface unit 211 performs transmission/reception of information via the network 100. The input/output port 212 is connected to an input device such as the keyboard 213, mouse 219, or the like, and is connected to an external device (not shown) other than the input device. Subsequently, the input/output port 212 performs transmission/reception of information to/from the input device or external device. The user inputs various types of information using the keyboard 213 or mouse 219. The I/O control unit 214 controls readout of information from the HDD 215, and writing of information to the HDD 215. The HDD 215 is a large-capacity storage device, and stores a program and various types of information. The RAM 216 stores a program to be executed by the CPU 210, and also stores various types of variable values necessary for execution of the program. The video interface unit 217 transmits information to be displayed on the display 218, to the display 218. The display 218 is a display device configured to display various types of information, and the user browses the information displayed on the display unit 218.

The hardware configuration of the authentication server 103 and the authentication server 104 are the same as the hardware configuration of the user terminal 102.

With the user terminal 102, the program of a Web browser (hereafter, referred to as WWW browser) is stored in the HDD 215. The program of the WWW browser is read out to the RAM 216, and is executed by the CPU 210 in accordance with an instruction from the user, whereby the WWW browser is activated. With the information processing apparatus 101, the program of a WWW server is stored in the HDD 206. After a while following the power of the information processing apparatus 101 being turned on, the program of the WWW server is read out to the RAM 203, and is executed by the CPU 202, whereby the WWW server is activated.

The WWW browser is connected to a WWW server based on an address, URL (Uniform Resource Locator), or a name specified by the user, and starts communication with the WWW server. As for a communication protocol at this time, the HTTP (Hyper Text Transfer Protocol) is employed. The WWW browser accesses the WWW server using the HTTP, and requests execution of a command from the WWW server. The WWW server executes the command, and transmits document information indicating the result thereof to the WWW browser. The document information at this time is described with the HTML (Hyper Text Markup Language) or the like. The WWW browser renders a screen based on the document information, and displays the screen thereof on the display 218.

Figure 3:
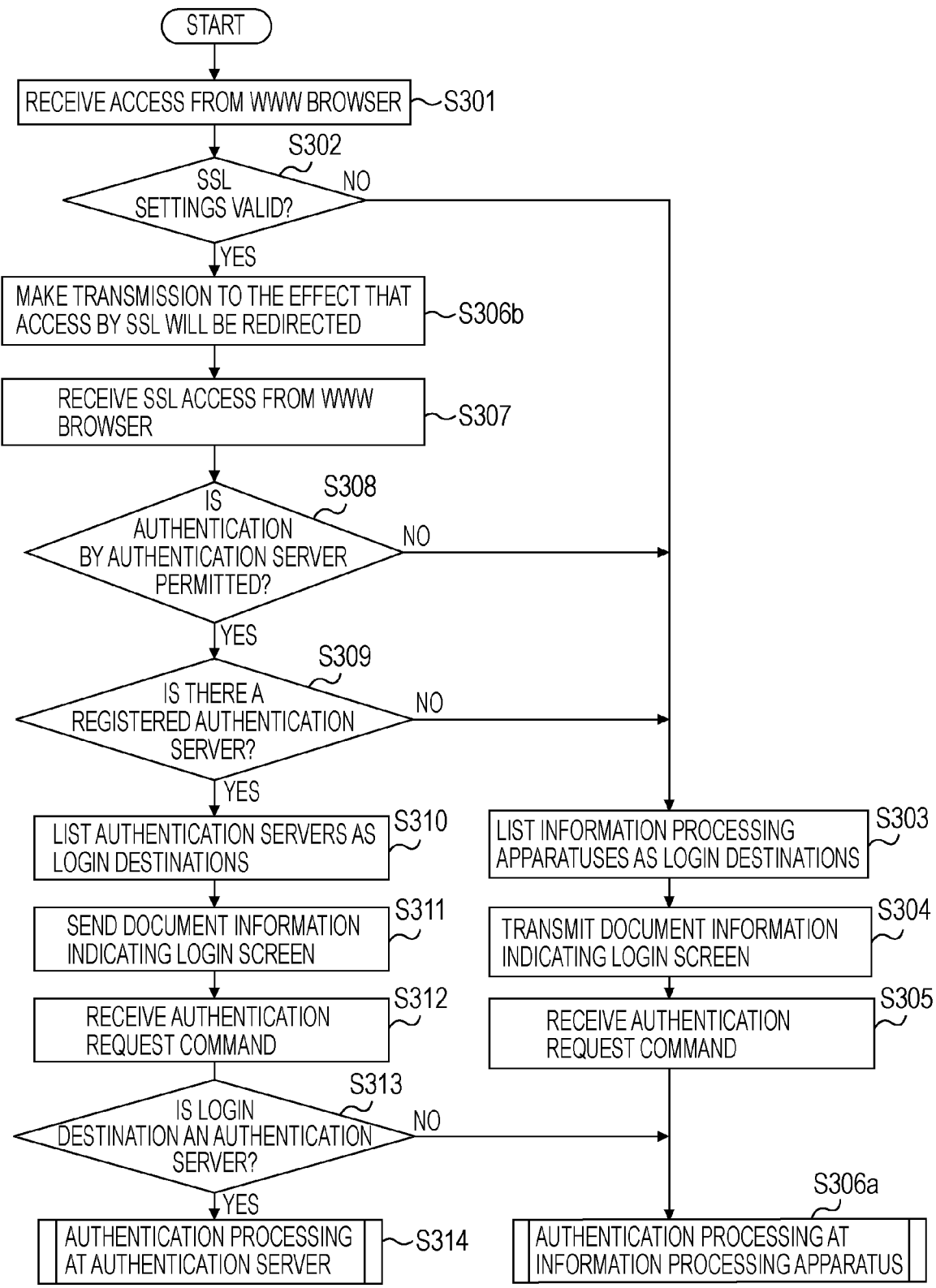
FIG. 3 is a flowchart illustrating information processing performed by the information processing apparatus 101.

Description will be made below regarding information processing according to the present invention. FIG. 3 is a flowchart illustrating information processing performed by the information processing apparatus 101. A program based on the flowchart shown in FIG. 3 is executed by the CPU 202, whereby this information processing is performed.

The information processing apparatus 101 receives access from the WWW browser of the user terminal 102 (step S301). In response to this, the information processing apparatus 101 determines whether the SSL settings (Secure Socket Layer) are valid or invalid (step S302).

Figure 4:
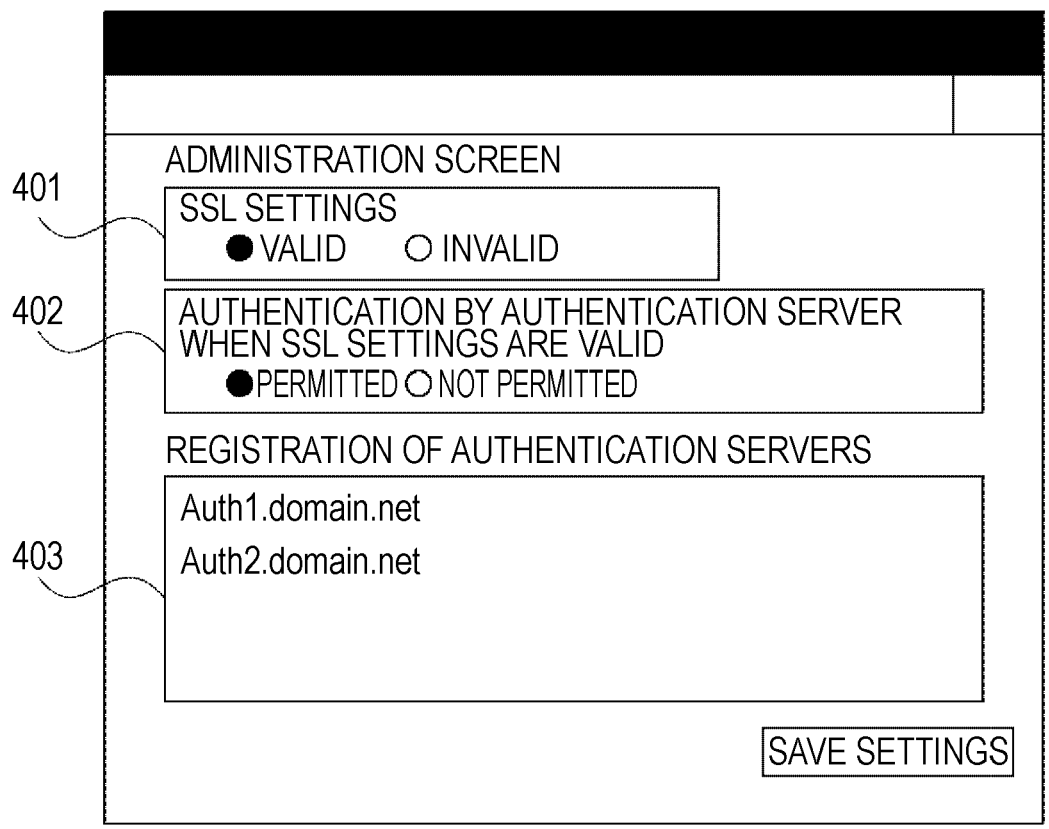
FIG. 4 is a diagram illustrating a management screen configured to enable or disable the SSL settings.

FIG. 4 is a diagram illustrating a management screen configured to enable or disable the SSL settings. Upon a user, having the right of an administrator, accessing the information processing apparatus 101 using the WWW browser, and succeeding in authentication as an administrator, the WWW browser displays a management screen. Also, the management screen may be displayed by the operating unit 207.

In FIG. 4, an option switch 401 is configured to enable or disable the SSL settings. In the event that the SSL settings are valid, encryption communication based on SSL can be employed, and in the event that the SSL settings are invalid, the encryption communication based on SSL cannot be employed. This SSL is a protocol employed for protecting communication by the HTTP between the WWW browser and the WWW server using encryption technology. In order to perform encryption communication employing SSL, the SSL settings need to be valid at the WWW server (information processing apparatus 101, here), and also the WWW browser needs to perform the encryption communication by SSL. As for the initial values of the information processing apparatus 101, the SSL settings are set to be invalid.

The information processing apparatus 101 itself supports its own user authentication method, whereby the password necessary for the authentication processing at the information processing apparatus 101 is protected, and accordingly, the encryption communication by SSL is not necessarily required. Therefore, the SSL settings may be set to be invalid.

An option switch 402 is a switch configured to permit authentication processing at an authentication server in the event that the SSL settings are valid, or prohibit authentication processing at the authentication server even in the event that the SSL settings are valid.

Under ordinary circumstances, with the encryption communication employing SSL, information to be transmitted/received is encrypted, and its safety is secured. That is to say, even in the event of the password necessary for the authentication processing at the authentication server being transmitted to the information processing apparatus 101 from the user terminal 102, the safety of the password is secured, and the password is protected from wiretapping, as long as the SSL settings are valid. However, with an environment wherein the authentication information employed for the authentication processing at the authentication server is managed more severely, the authentication information thereof is prevented from being transmitted via the network, so there is a case in which it is not desirable to permit the authentication processing to be performed at the authentication server. The option switch 402 is provided for such a case.

A field 403 is configured to allow the administrator to register an authentication server. The administrator inputs the name of an authentication server, whereby he/she can register multiple authentication servers. With the example shown in FIG. 4, the authentication server 103 and the authentication server 104 are registered.

With the example shown in FIG. 4, an arrangement has been made wherein the name of an authentication server is inputted, but other identification information arranged to identify an authentication server may be inputted. For example, with an environment wherein the network is managed in increments called domains, an authentication server exists for each domain. Accordingly, the name of each domain (hereafter, referred to as domain name) may be employed as identification information arranged to identify an authentication server.

Also, an arrangement may be made wherein the user not only inputs the name of an authentication server but also automatically obtains information indicating a list of authentication servers from a management server which exists on the network to register the name of an authentication server included in the list thereof. For example, a DNS server configured to search the IP address of a device from the names of devices which exist on the network stores the names of the multiple authentication servers as SRV records. The information processing apparatus 101 automatically obtains the names of the multiple authentication servers from the Service (SRV) records of the DNS server, and displays those in the field 403.

In the event of determining in step S302 that the SSL settings are invalid, communication is continued without employing SSL. The information processing apparatus 101 lists only the information processing apparatus 101 as a login destination, and generates document information indicating a login screen (step S303). Subsequently, the information processing apparatus 101 transmits the document information indicating the login screen to the user terminal 102 (step S304).

In the event that the SSL settings are invalid, only the authentication processing at the information processing apparatus 101 is permitted. With the authentication processing at an authentication server, the information processing apparatus 101 deputizes for the user terminal 102, and requests the authentication server to execute the authentication processing. Therefore, the information processing apparatus 101 needs the password itself inputted by the user, and it is necessary to transmit the password itself inputted by the user from the user terminal 102 to the information processing apparatus 101. In the event of the encryption communication employing SSL being performed, the password is encrypted, which protects the password from wiretapping, but in the event of the encryption communication employing SSL not being performed, the password is readily exposed to wiretapping. Therefore, in the event that the SSL settings are invalid, the authentication processing at an authentication server is arranged so as to not be performed.

On the other hand, with the authentication processing at the information processing apparatus 101, the password itself inputted by the user is not transmitted according to the following method.

Figure 5:
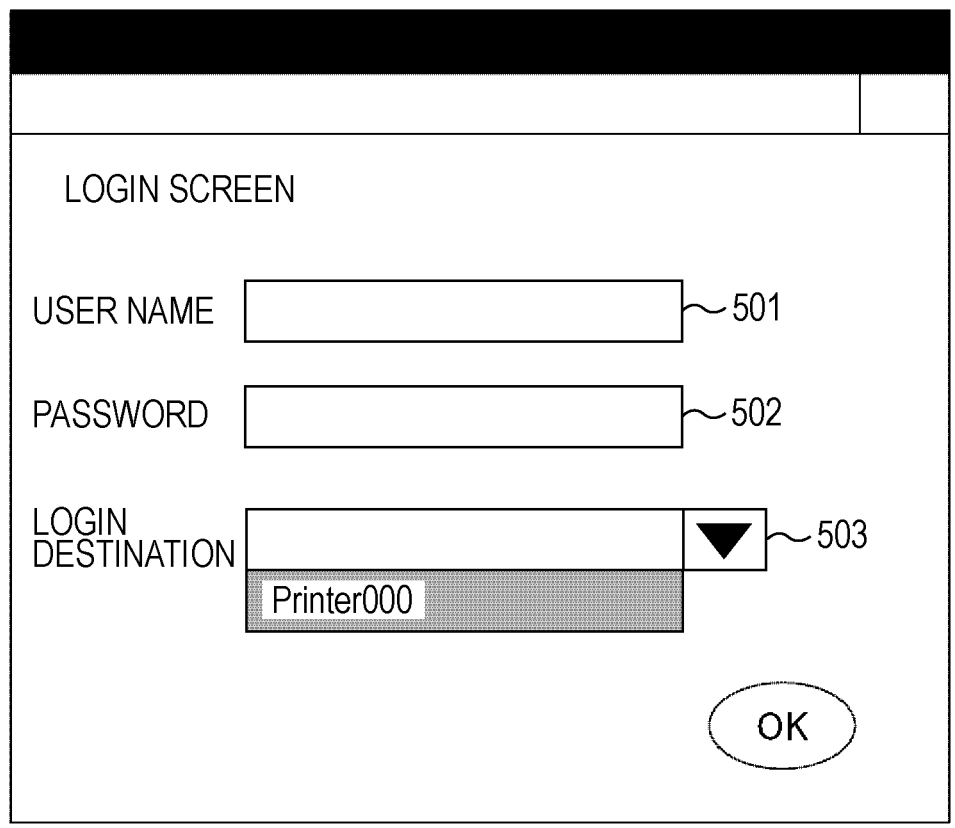
FIG. 5 is a diagram illustrating a login screen displayed by a WWW browser.

FIG. 5 is a diagram illustrating a login screen displayed by the WWW browser based on the document information transmitted in step S304. An input area 501 is configured to enable input of a user name, and an input area 502 is configured to enable input of a password. A pull-down menu 503 is configured to select a login destination. Authentication processing based on a user name and a password is performed at a login destination. With the login screen shown in FIG. 5, only the information processing apparatus 101 can be selected as a login destination.

Upon the user inputting a user name, a password, selecting a login destination, and pressing an OK button, the user terminal 102 transmits a command for requesting execution of the authentication processing (hereafter, referred to as authentication request command) to the information processing apparatus 101.

With the authentication processing at the information processing apparatus 101, it is not necessary to transmit the password itself inputted by the user to the information processing apparatus 101. The WWW browser subjects the password inputted by the user to processing using a particular function (e.g., hash function) having a unidirectional property. It is impossible to subject the value generated by the particular function thereof to inverse transformation to the original password.

The authentication request command indicates the user name inputted by the user, the value generated by the particular function (hereafter, referred to as second password), and the login destination selected by the user.

The information processing apparatus 101 receives the authentication request command thereof from the user terminal 102 (step S305). The login destination indicated by the authentication request command received here is always the information processing apparatus 101. Accordingly, the authentication processing of the information processing apparatus 101 is performed (step S306a).

Figure 6:
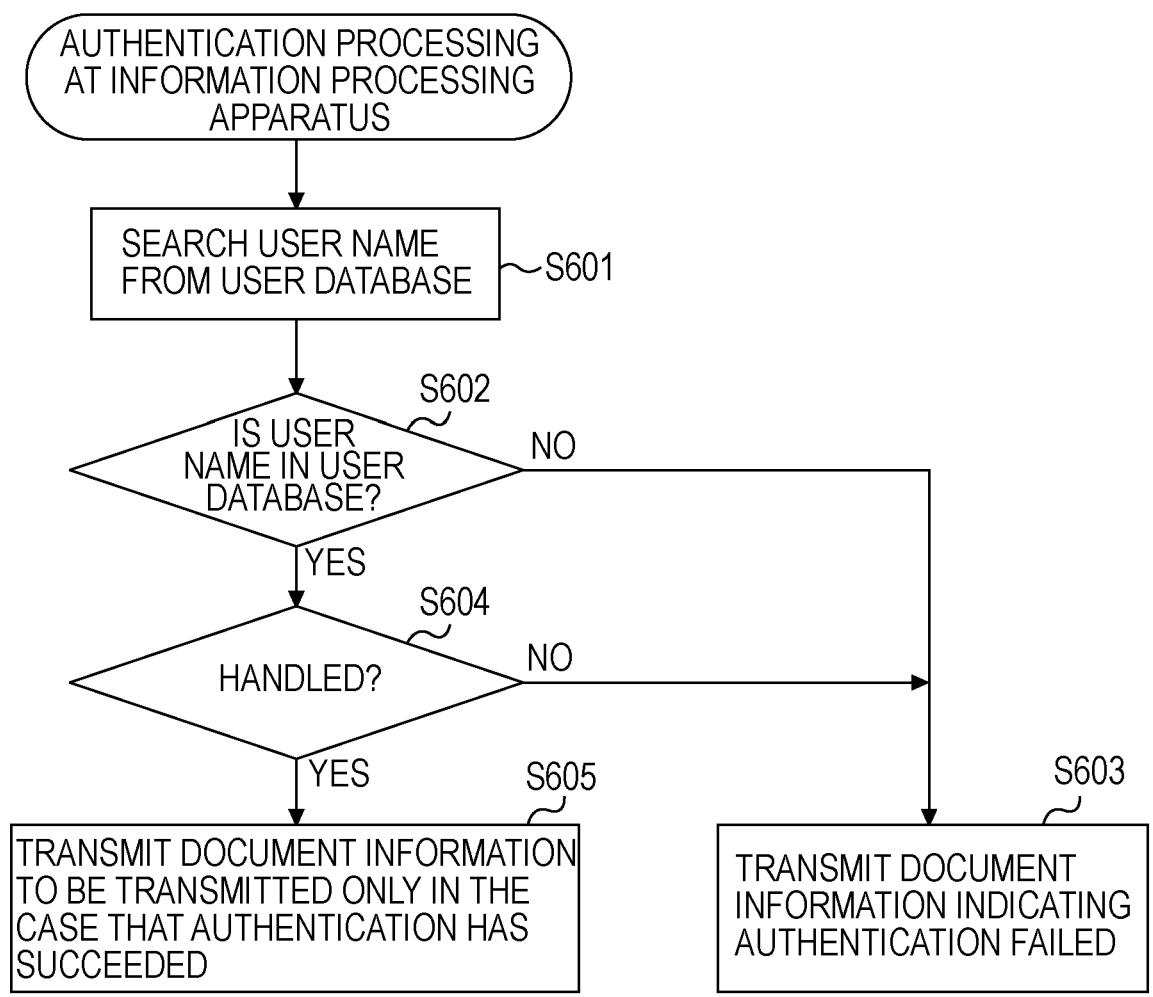
FIG. 6 is a flowchart illustrating authentication processing performed by the information processing apparatus 101.

FIG. 6 is a flowchart illustrating the authentication processing performed by the information processing apparatus 101. A program based on the flowchart shown in FIG. 6 is executed by the CPU 202, whereby this authentication processing is performed.

The HDD 206 of the information processing apparatus 101 retains a user database (hereafter, referred to as user DB). The user DB stores at least one set of a user name and a password for a user who is allowed to login to the information processing apparatus 101.

The information processing apparatus 101 searches the user name indicated by the authentication request command from the user DB (step S601). Subsequently, the information processing apparatus 101 determines based on the search result whether or not the user name indicated by the authentication request command exists within the user DB (step S602).

In the event that the user name indicated by the authentication request command does not exist within the user DB, the information processing apparatus 101 transmits document information to the effect that authentication has failed to the user terminal 102 (step S603). The WWW browser makes a display on the display 218 to the effect that authentication has failed, based on the document information thereof.

On the other hand, in the event that the user name indicated by the authentication request command exists within the user DB, the information processing apparatus 101 matches the second password indicated by the authentication request command against the password within the user DB, and determines whether or not these agree (step S604). In step S604, the information processing apparatus 101 first subjects the password found within the user DB to processing using the above-mentioned particular function to generate a second password. Subsequently, the information processing apparatus 101 determines whether or not the second password indicated by the authentication request command is identical to the second password generated from the password within the user DB.

In the event that the two second passwords are not identical, the information processing apparatus 101 transmits document information to the user terminal 102 to the effect that the authentication has failed (step S603). In the event that the two second passwords are identical, the information processing apparatus 101 transmits document information to the user terminal 102 that should be transmitted only in the case of the authentication succeeding (step S605). For example, the document information indicating the login screen shown in FIG. 5, document information indicating an operating screen configured to allow the user to operate printing processing at the information processing apparatus 101, or the like, is transmitted in step S605.

It is needless to say that the authentication method based on a user name and a password mentioned here is only one example, so authentication may be performed with another method.

In the event that determination has been made in step S302 in FIG. 3 that the SSL settings are valid, the information processing apparatus 101 transmits an instruction to redirect the access by SSL to the user terminal 102 so as to perform the encryption communication by SSL (step S306b). In accordance with this redirection instruction, the WWW browser switches the port employed for access to the WWW server from a port generally employed for HTTP communication to a port employed for HTTP communication protected by SSL. An example of the port generally employed for HTTP communication is Port 80, and an example of the port employed for the HTTP communication protected by SSL is Port 443. Subsequently, the WWW browser accesses to Port 443 using SSL again.

The information processing apparatus 101 receives the access (access to Port 443) from the WWW browser of the user terminal 102 (step S307). With the communication in step S307, SSL is employed.

Next, the information processing apparatus 101 determines whether the authentication processing at an authentication server is permitted or prohibited (step S308). The permission or prohibition of the authentication processing at an authentication server is set by the option switch 402 of the management screen.

Even in the event that the SSL settings are valid, when the authentication processing at an authentication server is prohibited, the information processing apparatus 101 proceeds to step S303. In this case, only the authentication processing at the information processing apparatus 101 is performed.

In the event that the authentication processing at an authentication server is permitted, the information processing apparatus 101 determines whether or not a registered authentication server exists (step S309). In the event that there is no registered authentication server, the information processing apparatus 101 proceeds to step S303.

In the event that a registered authentication server exists, the information processing apparatus 101 lists registered authentication servers as login destinations as well as the information processing apparatus 101, and generates document information indicating a login screen (step S310). Subsequently, the information processing apparatus 101 transmits the document information indicating the login screen to the user terminal 102 (step S311).

Figure 7:
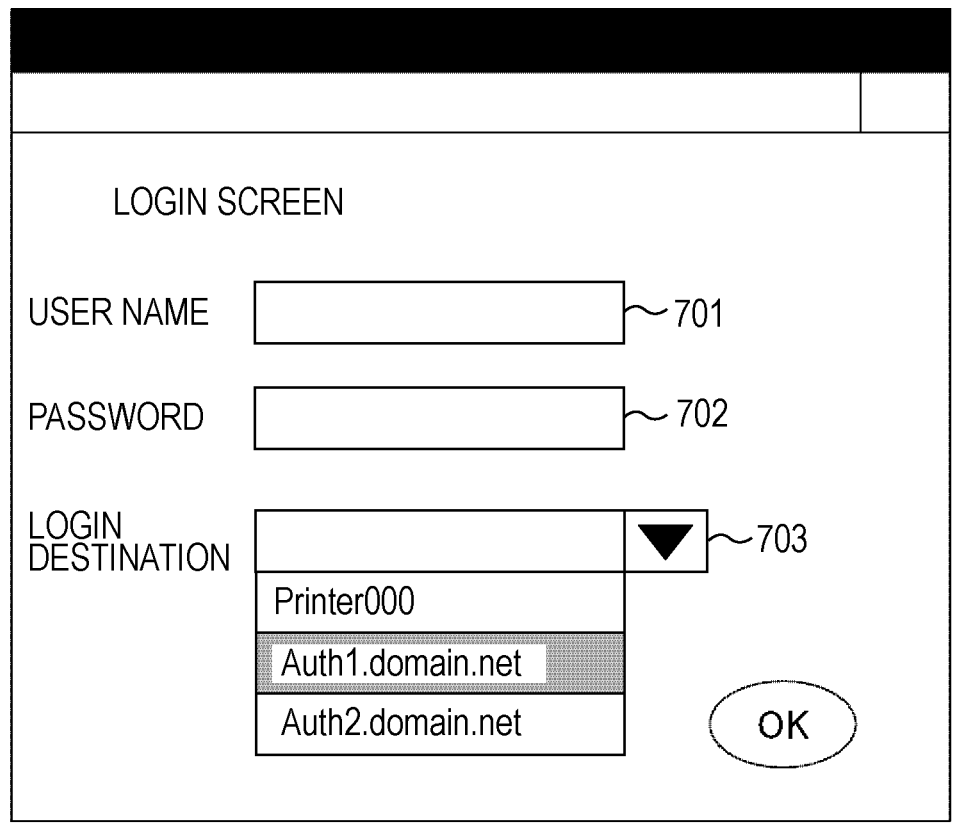
FIG. 7 is a diagram illustrating a login screen displayed by a WWW browser.

FIG. 7 is a diagram illustrating the login screen displayed by the WWW browser based on the document information transmitted in step S311. An input area 701 is arranged to enable input of a user name, and an input area 702 is arranged to enable input of a password. A pull-down menu 703 is configured to select a login destination. With the login screen shown in FIG. 7, not only the information processing apparatus 101 but also the authentication server 103 and the authentication server 104 are selectable as a login destination.

Upon the user inputting a user name and a password, selecting a login destination, and pressing the OK button, the user terminal 102 transmits the authentication request command to the information processing apparatus 101.

In the event of the user selecting the information processing apparatus 101 as a login destination, the authentication request command indicates the user name inputted by the user, a second password generated from the password inputted by the user, and the login destination selected by the user. In the event of the user selecting an authentication server as a login destination, the authentication request command indicates the user name inputted by the user, the password inputted by the user, and the login destination selected by the user.

The information processing apparatus 101 receives the authentication request command thereof from the user terminal 102 (step S312). Next, the information processing apparatus 101 determines whether the login destination indicated by the authentication request command is the information processing apparatus 101 or an authentication server (step S313). In the event that the login destination is the information processing apparatus 101, the information processing apparatus 101 proceeds to step S306*a*. In this case, the authentication processing at the information processing apparatus 101 is performed. In the event that the login destination is an authentication server, the authentication processing at the authentication server is performed (step S314).

Figure 8:
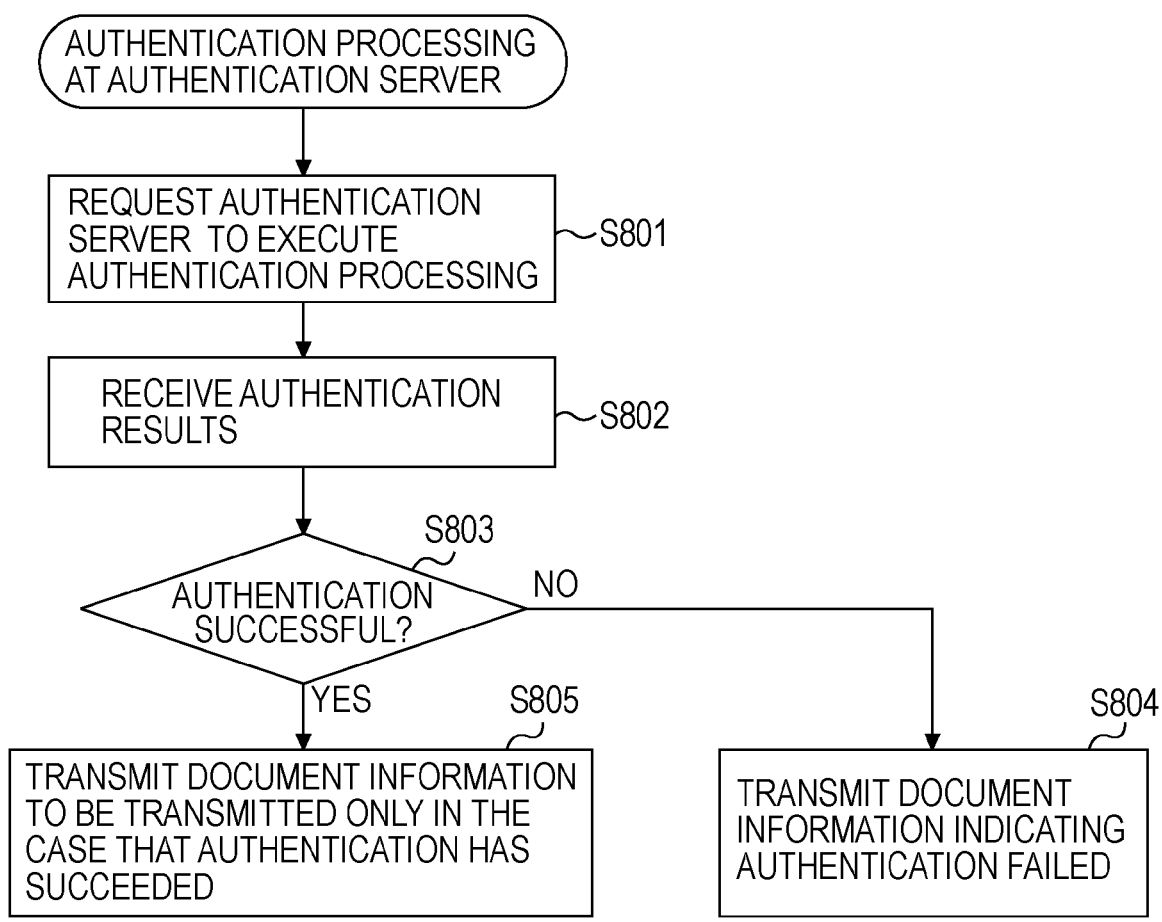
FIG. 8 is a flowchart illustrating information processing arranged to request an authentication server to execute authentication processing.

FIG. 8 is a flowchart illustrating information processing arranged to request an authentication server to execute the authentication processing. The CPU 202 executes the program based on the flowchart shown in FIG. 8, whereby this information processing is performed.

The information processing apparatus 101 requests execution of the authentication processing using a predetermined protocol from the authentication server selected as a login destination based on the user name and password indicated by the authentication request command received from the user terminal 102 (step S801). A predetermined protocol is a protocol supported by the authentication server selected as a login destination. For example, there are available protocols such as NTLM, Kerberos, and the like. With these protocols, a user name and a password are not transmitted from the information processing apparatus 101 to the authentication server as they are, but rather authentication processing is performed in accordance with a series of safety procedures.

Following the authentication processing being performed by the authentication server, the information processing apparatus 101 receives the authentication results from the authentication server (step S802). Subsequently, the information processing apparatus 101 determines whether the authentication has succeeded based on the received authentication results (step S803).

In the event of determining that the authentication has failed, the information processing apparatus 101 transmits document information to the effect that the authentication has failed to the user terminal 102 (step S804). The WWW browser makes a display on the display 218 to the effect that the authentication has failed, based on the document information thereof.

In the event of determining that the authentication has succeeded, the information processing apparatus 101 transmits document information that should be transmitted only in the case of the authentication succeeding to the user terminal 102 (step S805).

Other Embodiments

Description has been made in detail regarding an embodiment of the present invention, but it should be understood that the present invention is not restricted to the above-described embodiment. For example, the present invention may be applied to a system configured of multiple devices, or may be applied to an apparatus configured of one device.

Note that the present invention can also be attained by either directly or remotely supplying a software program arranged to realize the functions of the above-mentioned embodiment to a system or apparatus, and the system or apparatus reading and executing the supplied program. In this case, the form thereof is not restricted to a program as long as it has the functions of a program.

Accordingly, in order to realize the function processing of the present invention using a computer, a program code itself to be installed in the computer also realizes the present invention. That is to say, the scope of the present invention also includes the computer program itself to realize the function processing of the present invention. In this case, any program form may be employed, such as an object code, a program executed by an interpreter, script data to be supplied to an operating system (OS), and so forth, as long as it includes the functions of a program.

As for a recording medium configured to supply a program, various types may be employed. For example, a floppy disk, hard disk, optical disk, magneto-optical disk, MO, CD-ROM, CD-R, CD-RW, magnetic tape, nonvolatile memory card, ROM, DVD (DVD-ROM, DVD-R), and so forth are available.

Additionally, as for a method arranged to supply a program, a program can be supplied by accessing a homepage of the Internet using a browser of a client computer, and downloading a program from the homepage to a recording medium such as a hard disk or the like. In this case, a computer program itself according to the present invention, or a compressed file including an automatic install function, may be downloaded.

Also, program code making up the program of the present invention may be divided into multiple files, with each of the files being downloaded from a different homepage, whereby the program can be supplied. In other words, a WWW server configured to allow multiple users to download a program file configured to realize the function processing of the present invention at a computer is also included in the scope of the present invention.

Also, an arrangement may be employed wherein the program according to the present invention is encrypted, and stored in a recording medium such as CD-ROM or the like, and distributed to users. In this case, a user who satisfies predetermined conditions is allowed to download key information arranged to decode encryption from a homepage via the Internet, and is allowed to install the encrypted program in an executable form by using the key information thereof.

Also, the functions of the above-mentioned embodiment can be realized with an arrangement other than the above-mentioned arrangement by a computer executing the program that has been read out. For example, the operating system or the like running on the computer may perform part or all of the actual processing based on the instruction of the program thereof, with the functions of the above-mentioned embodiment being realized by the processing thereof.

Further, an arrangement may be made wherein the program read out from a recording medium is written to memory included in a function expansion board inserted in a computer or a function expansion unit connected to a computer. In this case, a CPU or the like included in the function expansion board or function expansion unit subsequently performs part or all of the actual processing based on the instruction of the program thereof, and the functions of the above-mentioned embodiment are realized by the processing thereof.

According to the present invention, in the event that encryption communication arranged to communicate encrypted information is not employed, authentication processing at an external authentication device can be prevented from being selected by a user.

Also, in the event that the encryption communication is not employed, a user is allowed to select authentication processing at an information processing apparatus, whereby authentication information necessary for authentication processing at an authentication server can be prevented from being transmitted from a user terminal to the information processing apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-170247 filed Jun. 20, 2006, which is hereby incorporated by reference herein in its entirety.

What is claimed is:

1. An information processing apparatus comprising:
an interface unit configured to transmit information which allows a user to select authentication processing at an external authentication device which is different from the information processing apparatus to a user terminal, and configured to receive authentication information necessary for authentication processing at the external authentication device which was inputted by the user from the user terminal using an encryption communication arranged to communicate encrypted information; and
a processing unit configured to control said interface unit to transmit the information which allows the user to select authentication processing at the external authentication device to the user terminal, in the case of employing the encryption communication, and to restrict transmission to the user terminal of the information which allows the user to select authentication processing at the external authentication device, in the case of not employing the encryption communication.

2. The information processing apparatus according to claim 1, wherein said interface unit transmits information which allows a Web browser to display a screen which allows a user to input authentication information necessary for authentication processing at the external authentication device, and select authentication processing at the external authentication device, in the case of employing the encryption communication.

3. The information processing apparatus according to claim 1, wherein said interface unit transmits information which allows a Web browser to display a screen which allows a user to input authentication information necessary for authentication processing at the information processing apparatus, and select authentication processing at the information processing apparatus, in the case of not employing the encryption communication.

4. The information processing apparatus according to claim 1, further comprising:
a setting unit configured to allow a user to select employing the encryption communication or not employing the encryption communication.

5. The information processing apparatus according to claim 1, wherein said processing unit controls said interface unit to transmits information which allows the user to select authentication processing at the information processing apparatus and does not allow the user to select authentication processing at the external authentication device to the user terminal, in the case of not employing the encryption communication.

6. The information processing apparatus according to claim 1, wherein said processing unit controls said interface unit to transmits the information which allows the user to select one of authentication processing at the external authentication device and authentication processing at the information processing apparatus to the user terminal, in the case of employing the encryption communication.

7. The information processing apparatus according to claim 1, wherein said processing unit requests authentication processing from the external authentication device selected by the user based on the authentication information received by said interface unit.

8. The information processing apparatus according to claim 1, wherein
said interface unit receives authentication information necessary for authentication processing at the information processing apparatus which was generated from authentication information input by the user, from the user terminal, in the case of not employing the encryption communication, and
said processing unit performs authentication processing based on the received authentication information, in the case of not employing the encryption communication.

9. An information processing apparatus comprising:
an interface unit configured to transmit information which allows a user to select authentication processing at an external authentication device which is different from the information processing apparatus to a user terminal, and configured to receive authentication information necessary for authentication processing at the external authentication device which was inputted by the user from the user terminal using an encryption communication arranged to communicate encrypted information;

a registering unit configured to allow a user to register an external authentication device which is different from the information processing apparatus; and a processing unit configured to control said interface unit to transmit information indicating a list of a plurality of external authentication devices registered by said registering unit, in the case of employing the encryption communication.

10. The information processing apparatus according to claim 9, wherein said processing unit controls said interface unit to transmit information indicating the information processing apparatus and not indicating the plurality of external authentication devices registered by said registering unit to the user terminal, in the case of not employing the encryption communication.

11. An information processing method comprising:

a transmission step arranged to transmit, from an information processing apparatus to a user terminal, information which allows a user to select authentication processing at an external authentication device which is different from the information processing apparatus, in the case of employing encryption communication arranged to communicate encrypted information; and a reception step arranged to receive authentication information necessary for authentication processing at the external authentication device which was inputted by the user from the user terminal to the information processing apparatus using the encryption communication, wherein the transmission step to transmit the information which allows the user to select authentication processing at the external authentication device is not executed, in the case of not employing the encryption communication.

12. The information processing method according to claim 11, wherein said transmission step is arranged to transmit information which allows a Web browser to display a screen which allows a user to input authentication information necessary for authentication processing at the external authentication device, and select authentication processing at the external authentication device, in the case of employing the encryption communication.

13. The information processing method according to claim 11, further comprising:

a second transmission step arranged to transmit information which allows a Web browser to display a screen which allows a user to input authentication information necessary for authentication processing at the information processing apparatus, and select authentication processing at the information processing apparatus, in the case of not employing the encryption communication.

14. The information processing method according to claim 11, further comprising:

a setting step arranged to allow a user to select employing or not employing the encryption communication.

15. An information processing method comprising:

a registering step arranged to allow a user to register an external authentication device which is different from an information processing apparatus;

a transmission step arranged to transmit, from the information processing apparatus to a user terminal, information indicating a list of a plurality of external authentication devices registered in said registering step, in the case of employing an encryption communication arranged to communicate encrypted information; and a reception step arranged to receive authentication information necessary for authentication processing at the external authentication device which was inputted by the user from the user terminal to the information processing apparatus using the encryption communication.

16. The information processing method according to claim 15, further comprising:

a second transmission step arranged to transmit, from the information processing apparatus to the user terminal, information indicating the information processing apparatus and not indicating the plurality of external authentication devices registered in said registering step, in the case of not employing the encryption communication.

17. A non-transitory recording medium storing a computer program, which a computer of an information processing apparatus can read and also execute, causing said computer to execute:

a transmission step arranged to transmit information which allows a user to select authentication processing at an external authentication device which is different from the information processing apparatus to a user terminal, in the case of employing encryption communication arranged to communicate encrypted information; and a reception step arranged to receive authentication information necessary for authentication processing at the external authentication device which was inputted by the user from the user terminal using the encryption communication, wherein the transmission step to transmit the information which allows the user to select authentication processing at the external authentication device is not executed, in the case of not employing the encryption communication.

18. An information processing apparatus comprising:

an interface unit configured to transmit, to a user terminal, first information which allows a user to select authentication processing at an external authentication device which is different from the information processing apparatus or second information which allows a user to select authentication processing at the information processing apparatus and does not allow the user to select authentication processing at the external authentication device, and configured to receive authentication information necessary for authentication processing at the external authentication device which was inputted by the user from the user terminal using an encryption communication arranged to communicate encrypted information; and a processing unit configured to control said interface unit to transmit the first information which allows the user to select authentication processing at the external authentication device to the user terminal, in the case of employing the encryption communication, and to control said interface unit to transmit the second information which allows the user to select authentication processing at the information processing apparatus and does not allow the user to select authentication processing at the external authentication device to the user terminal, in the case of not employing the encryption communication.

19. The information processing apparatus according to claim 18, wherein said processing unit requests authentication processing from the external authentication device selected by the user based on the authentication information received by said interface unit, said interface unit receives authentication information necessary for authentication processing at the information processing apparatus which was generated from authentication information input by the user, from the user terminal, in the case of not employing the encryption communication, and said processing unit performs authentication processing based on the authentication information received by said interface unit, in the case of not employing the encryption communication.

* * * * *